(12) United States Patent
Janes

(10) Patent No.: US 11,490,607 B2
(45) Date of Patent: Nov. 8, 2022

(54) FISH HOLDING APPARATUS

(71) Applicant: William Janes, Louisville, NY (US)

(72) Inventor: William Janes, Louisville, NY (US)

(*) Notice: Subject to any disclaimer, the term of this patent is extended or adjusted under 35 U.S.C. 154(b) by 57 days.

(21) Appl. No.: 17/067,266

(22) Filed: Oct. 9, 2020

(65) Prior Publication Data

US 2021/0105989 A1    Apr. 15, 2021

Related U.S. Application Data

(63) Continuation-in-part of application No. 29/714,108, filed on Nov. 21, 2019, now Pat. No. Des. 914,130.

(60) Provisional application No. 62/913,059, filed on Oct. 9, 2019.

(51) Int. Cl.
*A01K 97/00*    (2006.01)

(52) U.S. Cl.
CPC .................................... *A01K 97/00* (2013.01)

(58) Field of Classification Search
CPC ................................ A01K 97/00; B25G 1/102
See application file for complete search history.

(56) References Cited

U.S. PATENT DOCUMENTS

| 6,202,964 B1* | 3/2001 | Thornhill | E04G 3/00 |
| | | | 248/219.4 |
| 2011/0049315 A1* | 3/2011 | Buckbee | F16M 13/02 |
| | | | 248/219.4 |
| 2014/0001785 A1* | 1/2014 | Lavarias | A01K 97/00 |
| | | | 294/211 |
| 2018/0333836 A1* | 11/2018 | Huner | B25G 1/10 |

* cited by examiner

*Primary Examiner* — Joshua E Rodden
*Assistant Examiner* — Henry Hooper Mudd

(57) ABSTRACT

The fish-holding apparatus is a stick device which may be used to take pictures of fish. The device may be attached to any boat that has a pedestal hole to secure the device. In addition, the device may be held in hand by a user, with a fish positioned at one end of the device, so as to allow taking of a picture of the fish itself or of a group picture together with the fish. Further, the apparatus includes additional support members for better stability and gripping elements for improved ease of use. Additionally, the fish-holding apparatus has access for installing a variety of attachable links, to which a wide variety for fish-grips and/or hanging scales may be attached to. The fish-holding apparatus provides a cost-effective, portable, and easy-to-use device for taking pictures of fish.

9 Claims, 6 Drawing Sheets

FISH HOLDING APPARATUS

The current application claims a priority to the U.S. Provisional Patent application Ser. No. 62/913,059 filed on Oct. 9, 2019.

FIELD OF THE INVENTION

The present invention relates generally to a fishing apparatus. More specifically, the present invention relates to a portable fish-holding device for photographing fish.

BACKGROUND OF THE INVENTION

In present times, individuals are always looking for a fishing device designed for photographing fish. As smartphones have increasingly been equipped with high-quality cameras, digital photographs have been more and more commonly taken using smartphones instead of dedicated cameras, an approach that has allowed the easy sharing of photographs over social networks. Most smartphone cameras feature a mirror mode, in which it is possible to take a picture of oneself while still viewing the front surface of the display. In the conventional method of taking self-portraits, the lens of the photographing means is directed toward the user, who stretches his or her arm forward to take a picture of himself or herself. Alternatively, sticks or rods have been designed to extend the distance between self and camera. However, such sticks are not designed for photographing fish. Avid fishermen commonly land trophy fish whose teeth, fins, or gills could cause harm to a person standing nearby. A device is needed that allows the taking of a picture of a fish without requiring that the photographer hold the fish while taking the picture. Most currently available mobile cameras installed in boats for such use are expensive, so a cost-effective solution is needed.

It is an objective of the present invention to solve the problems associated with conventional devices through the innovative design of a stick device which may be used to take pictures of fish. In the preferred embodiment, the device may be attached to any boat that has a hole to secure the device. In addition, the device may be held by a person with a fish positioned at one end of the device, allowing the user to take a picture of the fish itself or a group picture together with the fish. Further, the present invention comprises additional support members for better stability and gripping elements for improved ease of use. Furthermore, the present invention provides an access hole for installing a wide variety of fasteners and fish grips, so as to take pictures of a wide variety of fish. Thus, the present invention provides a cost-effective, portable, and easy-to-use device for taking pictures of fish.

DETAIL DESCRIPTIONS OF THE INVENTION

All illustrations of the drawings are for the purpose of describing selected versions of the present invention and are not intended to limit the scope of the present invention.

In reference to FIG. 1 through FIG. 6, the present invention is a fish holding apparatus. It is an objective of the present invention to provide the innovative design of a stick device which may be used to take pictures of fish. In the preferred embodiment, the device may be attached to any boat that has a hole to secure the device. In addition, the device may be held by a user with a fish positioned at one end of the device, thereby allowing the user to take pictures of the fish itself or of group pictures together with the fish. Further, the present invention comprises additional support members for better stability and gripping elements for improved ease of use for the users. Furthermore, the present invention has access for installing a variety of attachable links, to which a wide variety for fish-grips or hanging scales may be attached to.

Figure 1:
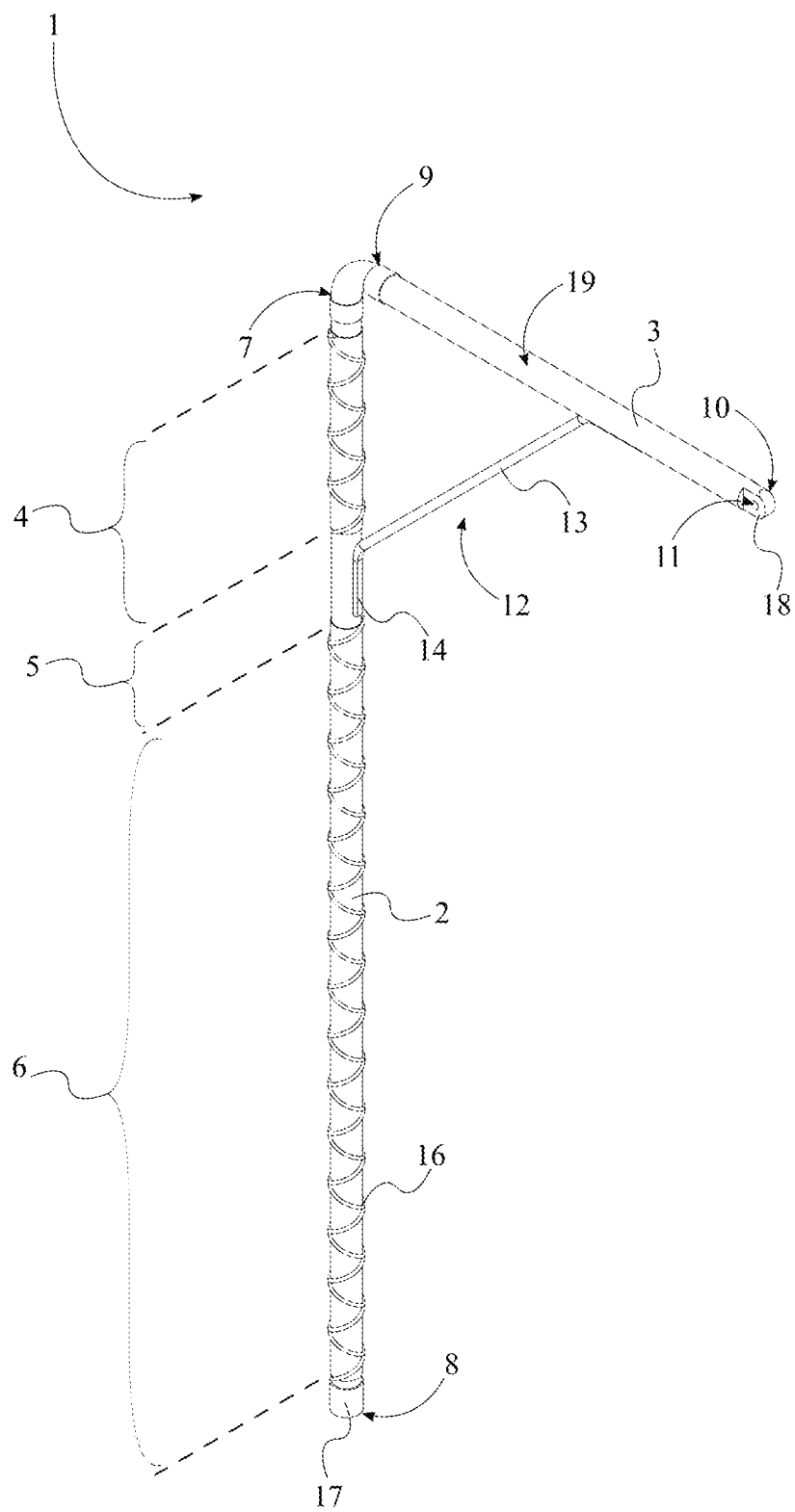
FIG. 1 is a top-front-left perspective view of the present invention.
Figure 2:
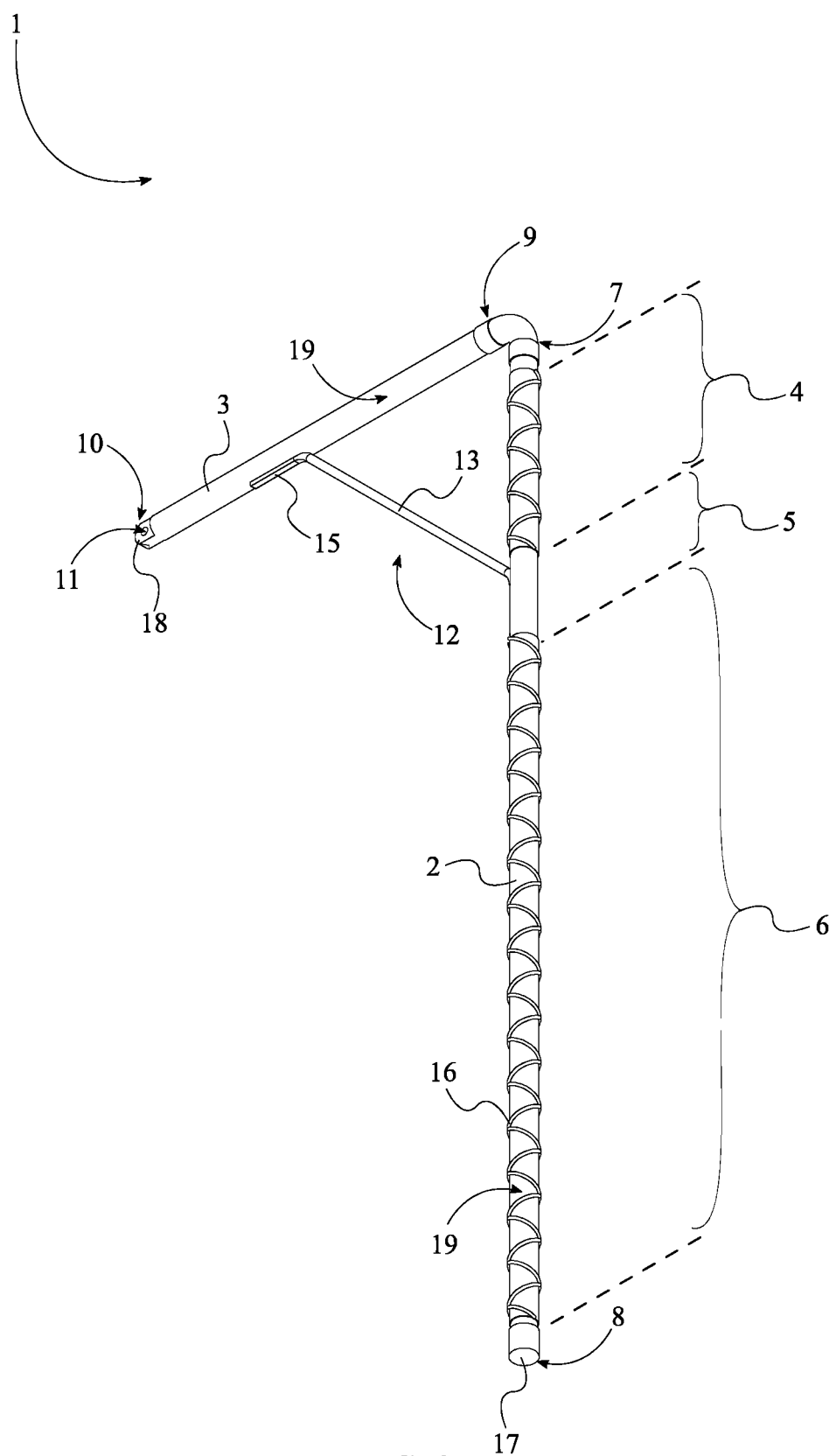
FIG. 2 is a bottom-rear-right perspective view of the present invention.
Figure 3:
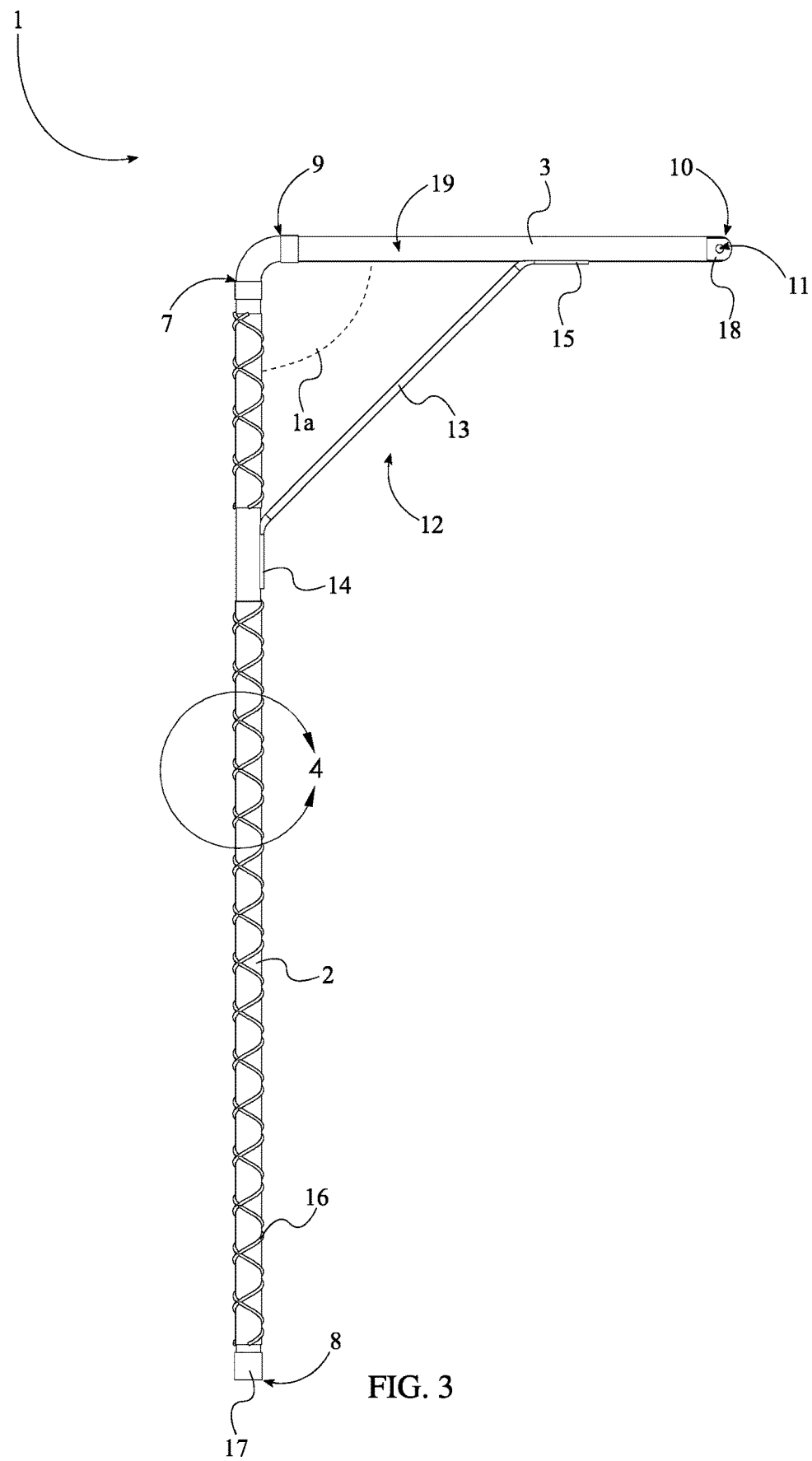
FIG. 3 is a left-side elevational view of the present invention.

The following description is in reference to FIG. 1 through FIG. 6. In order to accomplish the objectives of the present invention, the fish holding apparatus comprises an angled rod 1, wherein the angled rod 1 comprises a handle 2 and a fish-holding segment 3. Preferably, the handle 2 is angularly offset from the fish-holding segment 3, and the angled rod 1 is offset by an angle 1a degrees. As seen in FIG. 3, 1a is preferably 90 degrees, thereby providing the angled rod 1 an L-shape. However, the angled rod 1 may comprise any degree of angular offset, as long as the objectives of the present invention are fulfilled. Further, in the preferred embodiment, the handle 2 is longer than the fish-holding segment 3. This is so that it is easy for the user to hold the angled rod 1 by the handle 2 and hang the fish from the fish-holding section 3 in such a way that the fish hangs from a height above the ground and it is convenient for photographing the fish. In the preferred embodiment, the angled rod 1 comprises a cylindrical shape, and is made of a sturdy material that can hold the shape and support the weight that may be hung on the angled rod 1. For example, a 12" or 15" nonferrous material pipe can be welded to a 24", 36", or 42" elongated component to make a 90° or L-shaped angled rod 1. However, the angled rod 1 may comprise any other shape, angular offset, size, length, color, material, components and arrangement of components, as long as the intents of the present invention are fulfilled.

According to a preferred embodiment of the present invention, the handle 2 comprises a proximal section 4, an intermediate section 5, a distal section 6, a first end 7, and a second end 8. As seen in FIG. 1 through FIG. 3, and FIG. 5, the proximal section 4 is positioned in between the first end 7 and the intermediate section 5, the intermediate section 5 is positioned between the proximal section 4 and the distal section 6, and the distal section 6 is positioned in between intermediate section 5 and the second end 8. This demarcation depicts regions that are ideal for holding with the hands, and regions that are not. In the preferred embodiment, the proximal section 4 constitutes the region near the fish-holding segment 3 and the distal section 6 constitutes the region farthest from the fish-holding segment 3. Further, the first end 7 is positioned opposite to the second end 8 across the handle 2, such that the first end 7 constitutes a top end of the handle 2 and the second end 8 constitutes a bottom end of the handle 2. In the preferred embodiment, the present invention may include various sizes for the proximal section 4 and the distal section 6. For example, a 24" (small) handle 2 may include a 12" distal section 6. Similarly, a 36" (medium) handle 2 may include a 6" proximal section 4 and a 20" distal section 6, and a 42" (large) handle 2 may include a 6" proximal section 4 and a 24" distal section 6. However, the handle 2 may be separated into any different number of segments and may comprise any additional components and arrangement of components, so as to improve the efficiency and functionality of the present invention. Examples of such additional components include, but are not limited to, a coupling element that enables to fix the handle 2 to a tripod, an indentation for resting the handle 2 on an external object/device, a fastening hole to thread a securing fastener etc.

As seen in FIG. 1 through FIG. 3, the fish-holding segment 3 comprises a third end 9, a fourth end 10, and an aperture 11. Preferably, the third end 9 is positioned opposite to the fourth end 10 across the fish-holding segment 3. More specifically, the fish-holding segment 3 constitutes the smaller segment of the L-shaped angled rod 1, wherein the third end 9 and the fourth end 10 constitute the two opposing ends of the fish-holding segment 3. Furthermore, the third end 9 is connected to the first end 7 of the handle 2, such that the handle 2 and the fish-holding segment 3 together constitute a seamless connected entity to form the angled rod 1. As seen in FIG. 1 through FIG. 3, the first end 7 and the third end 9 are welded by means of an elbow pipe. However, the handle 1 and the fish-holding segment may be connected by means of any fasteners or fastening techniques, that are known to one of ordinary skill in the art, as long as the objectives of the present invention are fulfilled. To that end, the handle 2 and the fish-holding segment 3 may comprise no connectors at all and may comprise just a single rod that is bent to form the angled rod 1. In order to enable users to hang a fish on the fish holding apparatus, the aperture 11 is positioned adjacent the fourth end 10. Preferably, the aperture 11 traverses through the fish-holding segment 3, and the aperture 11 is a hole that spans a few millimeters in diameter. Accordingly, the aperture 11 acts as the receiving end for a variety of attachable links, such as a fastening element, a fish grip, or a hanging fish scale. For example, a fish gripper or any similar fish holding device may be attached to a fastening element or suitable connector that is threaded through the aperture 11, to facilitate the positioning of fish at the end of the fish-holding segment 3. Examples of the fastening element include, but are not limited to spring link, D-clip, snap slips, S-ring hooks etc. However, any fastening element and/or fish gripping device that is known to one of ordinary skill in the art may be used to hang the fish from the fish-holding segment 3, as long as the objectives of the present invention are not hindered.

In order to provide enough support and stability to the angled rod 1, the present invention comprises a supporting member 12. To that end, the supporting member 12 is connected between the handle 2 and the fish-holding segment 3. In the preferred embodiment, the supporting member 12 comprises a rod 13, a first flat surface 14, and a second flat surface 15. As seen in FIG. 3, the first flat surface 14 is positioned opposite to the second flat surface 15 across the rod 13, such that the flat surfaces enable the user to secure the supporting member 12 onto the angled rod 1. In other words, the supporting member 12 may be secured to the angled rod 1 by attaching the first flat surface 14 to the handle 2 and the second flat surface 15 to the fish-holding segment 3. This arrangement of the supporting member 12 also determines the demarcation of the handle 2 into the two sections, the proximal section 4 and the distal section 6. As seen in FIG. 1 through FIG. 3, the first flat surface 14 is mounted onto the intermediate section 5 of the handle 2 that faces the fish-holding segment 3, and the second flat surface 15 is mounted onto the fish-holding segment 3 that faces the handle 2. Accordingly, the supporting member 12 is positioned adjacent the angular offset 1a between the handle 2 and the fish-holding segment 3, such that the supporting member 12 acts as a corner brace for the angled rod 1. For example, the supporting member 12 may be an angle bracket in three different sizes (e.g., 8"×¼", 12"×¼", and 12"×¼", respectively, for the small, medium, and large handles). Preferably, the supporting member 12 is made of a sturdy metal such as solid aluminum and may be mounted onto the angled rod 1 by means of pan screws and nuts. However, the supporting member 12 may comprise any other size, shape, components and arrangement of components that are known to one of ordinary skill in the art, as long as the intents of the present invention are not altered. Similarly, the supporting member 12 may be mounted on to the angled rod 1 by means of any other fasteners or fastening techniques, as long as the objectives of the present invention are fulfilled.

Figure 4:
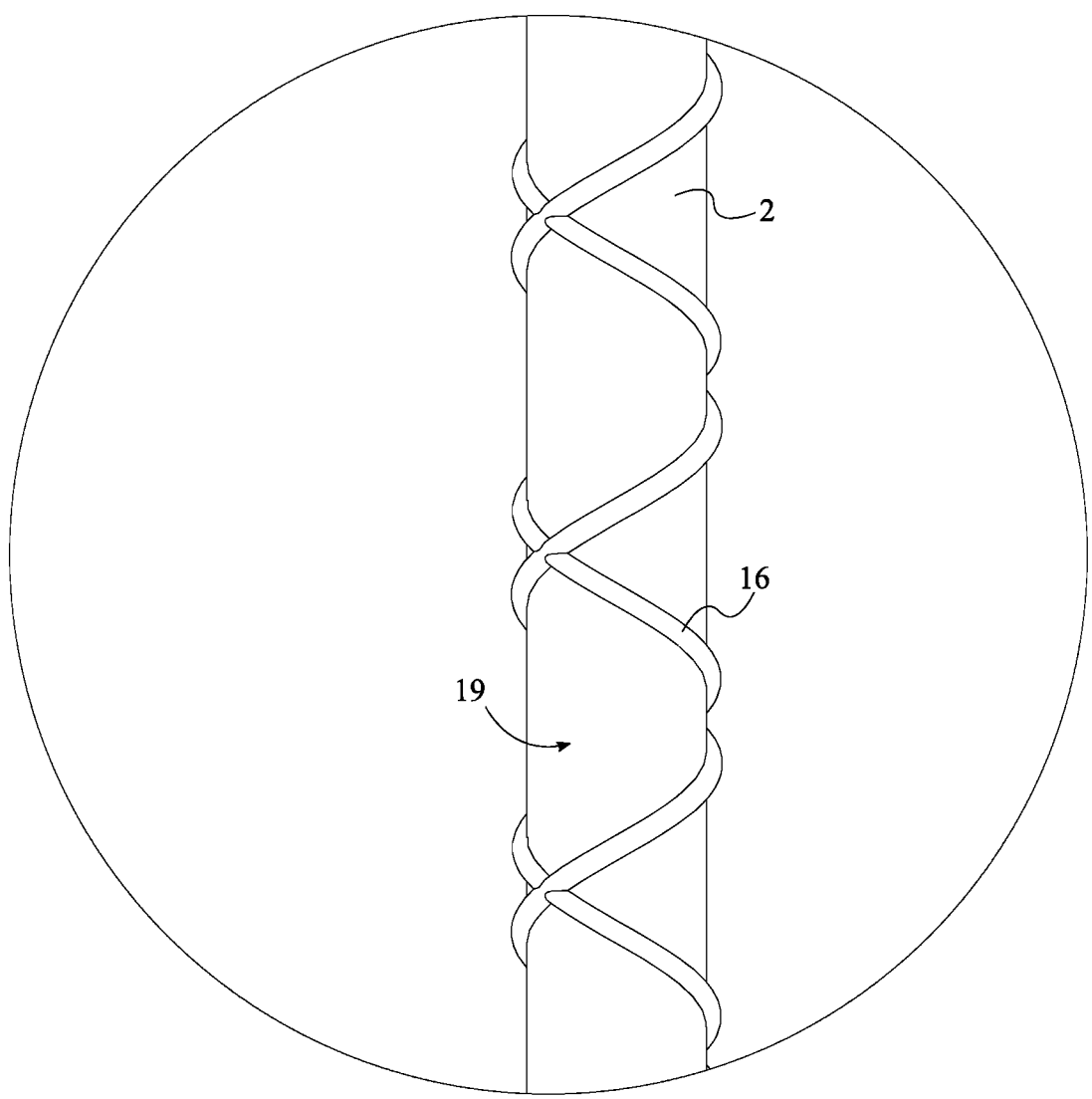
FIG. 4 is a detailed view of section 4 of FIG. 3.
Figure 5:
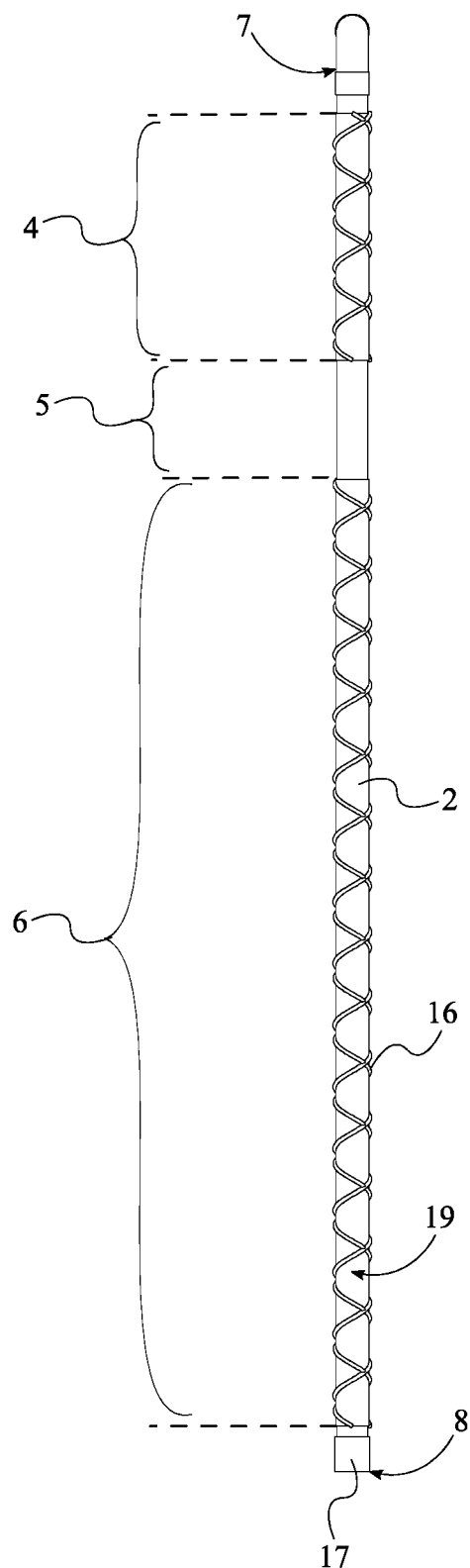
FIG. 5 is a rear elevational view of the present invention.
Figure 6:
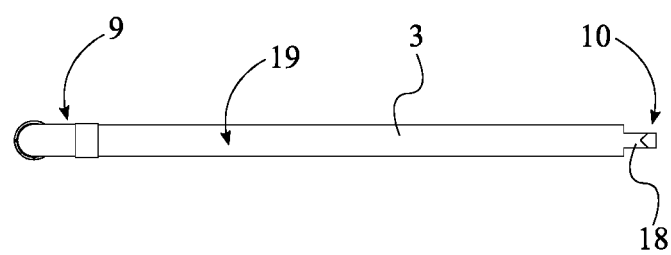
FIG. 6 is a top plan view of the present invention.

In order to implement the ability to hold the fish holding device securely and conveniently by hand, the present invention comprises at least one gripping element 16. Accordingly, the at least one gripping element 16 is laterally attached to at least one of, the proximal section 4 and the distal section 6. This is so that, the user may be provided with a good grip at different positions along the handle 2 for handling the device securely, even if the user's hands are wet. In the preferred embodiment, the at least one gripping element 16 is a nylon cord wound around the handle. For example, the handle 2 may include a nylon parachute cord or shrink tubing wrapped around the handle at specific intervals. Further, as seen in FIG. 4, the cord may be wound symmetrically around the handle 2 as many times as desired to allow a sufficient grip on the handle 2 of the angled rod 1. However, the gripping element 16 may comprise any other material, size, shape, components or arrangement of components that are known to one of ordinary skill in the art, as long as the intents of the present invention are not altered.

According to the preferred embodiment, the angled rod 1 may be secured to a pedestal pole holder on a boat or any other structure. To that end, as well as to provide a smooth and aesthetically appealing end portion, the handle 2 comprises an end cap 17. As seen in FIG. 1 through FIG. 3 and FIG. 5, the end cap 17 is terminally connected to the handle 2, and the end cap 17 is positioned adjacent the second end 8. In other words, the end cap 17 constitutes a base area of the handle, which may be secured into a pedestal hole, or any similar surface. Preferably, the end cap 17 is made of a non-ferrous material, such that the fishing environment does not easily corrode or damage the end cap 17. However, the end cap 17 may comprise any other shape, material, size, or components, as long as the objectives of the present invention are fulfilled. Thus, the present invention gives the user the provision to take photographs of the fish with ease and comfort, by securing the handle 2 of the angled rod 1 to an external surface and hanging the fish at the fish-holding segment 3.

As seen in FIG. 1 through FIG. 3 and FIG. 6, the fish-holding segment 3 comprises a flattened region 18. Preferably, the flattened region 18 is positioned adjacent the fourth end 10 of the fish-holding segment 3, and the aperture 11 traverses through the flattened region 18. This is so that, the flattened region 18 would allow users to install a fastening element or a fish gripper through the aperture 11 with ease.

In order to provide surface protection and durability in the fishing environment, the angled rod 1 comprises at least one layer of non-ferrous and water-proof coating 19. Preferably, the at least one layer of non-ferrous and water-proof coating 19 laterally encompasses the angled rod 1, such that the entire external surface of the device is protected from corrosion, rusting, and quicker wear and tear. For example, the angled rod 1 and the supporting member 12 may be painted or covered by one or more chip resistant coatings. Further, the present invention may then be covered by a smooth heat shrink wrap in all areas except the flattened region 18. However, the at least one layer of non-ferrous and water-proof coating 19 may comprise any other material, shape, color, components, technology etc. that are known to one of ordinary skill in the art, as long as the objectives of the present invention are fulfilled.

Thus, the present invention provides a simple, cost-effective, portable, and easy-to-use device for taking pictures of fish.

Although the invention has been explained in relation to its preferred embodiment, it is to be understood that many other possible modifications and variations can be made without departing from the spirit and scope of the invention as hereinafter claimed.

What is claimed is:

1. A fish holding apparatus comprising:
an angled rod;
the angled rod comprising a handle and a fish-holding segment;
the handle comprising a proximal section, an intermediate section, a distal section, a first end, and a second end;
the fish-hanging section comprising a third end, a fourth end, and an aperture;
the handle being angularly offset from the fish-holding segment;
the proximal section being positioned in between the first end and the intermediate section;
the intermediate section being positioned between the proximal section and the distal section;
the distal section being positioned in between intermediate section and the second end;
the first end being positioned opposite to the second end across the handle;
the third end being positioned opposite to the fourth end across the fish-holding segment;
the third end being connected to the first end of the handle;
the aperture traversing through the fish-holding segment;
the aperture being positioned adjacent the fourth end;
at least one gripping element;
the at least one gripping element being laterally attached to at least one of, the proximal section and the distal section;
the at least one gripping element is a nylon cord wound around the handle;
at least one layer of non-ferrous and water-proof coating;
the at least one layer of non-ferrous and water-proof coating laterally encompassing the angled rod; and
the angled rod is cylindrical in shape.

2. The fish holding apparatus of claim 1 comprising:
a supporting member; and
the supporting member being connected between the handle and the fish-holding segment.

3. The fish holding apparatus of claim 2, the supporting member comprising:
a rod;
a first flat surface;
a second flat surface;
the first flat surface being positioned opposite to the second flat surface across the rod;
the first flat surface being mounted onto the intermediate section of the handle that faces the fish-holding segment; and
the second flat surface being mounted onto the fish-holding segment that faces the handle.

4. The fish holding apparatus of claim 2, wherein the supporting member is positioned adjacent an angled corner between the handle and the fish-holding segment.

5. The fish holding apparatus of claim 1, comprising:
an end cap;
the end cap being terminally connected to the handle; and
the end cap being positioned adjacent the second end.

6. The fish holding apparatus of claim 1, comprising:
a flattened region;
the flattened region being positioned adjacent the fourth end of the fish-holding segment; and
the aperture traversing through the flattened region.

7. A fish holding apparatus comprising:
an angled rod;
a supporting member;
the angled rod comprising a handle and a fish-holding segment;
the handle comprising a proximal section, an intermediate section, a distal section, a first end, and a second end;
the fish-hanging section comprising a third end, a fourth end, and an aperture;
the handle being angularly offset from the fish-holding segment;
the proximal section being positioned in between the first end and the intermediate section;
the intermediate section being positioned between the proximal section and the distal section;
the distal section being positioned in between intermediate section and the second end;
the first end being positioned opposite to the second end across the handle;
the third end being positioned opposite to the fourth end across the fish-holding segment;
the third end being connected to the first end of the handle;
the aperture traversing through the fish-holding segment;
the aperture being positioned adjacent the fourth end;
the supporting member being connected between the handle and the fish-holding segment;
at least one gripping element;
an end cap;
the at least one gripping element being laterally attached to at least one of the proximal section and the distal section;
the end cap being terminally connected to the handle;
the end cap being positioned adjacent the second end; and
the at least one gripping element is a nylon cord wound around the handle.

8. The fish holding apparatus of claim 7, the supporting member comprising:
a rod;
a first flat surface;
a second flat surface;
the first flat surface being positioned opposite to the second flat surface across the rod;
the first flat surface being mounted onto the intermediate section of the handle that faces the fish-holding segment; and
the second flat surface being mounted onto the fish-holding segment that faces the handle.

9. The fish holding apparatus of claim 7, comprising:
a flattened region;
the flattened region being positioned adjacent the fourth end of the fish-holding segment; and
the aperture traversing through the flattened region.

* * * * *